May 17, 1960  D. L. MILLER  2,936,629
ENGINE STARTER DRIVES
Filed Feb. 14, 1958
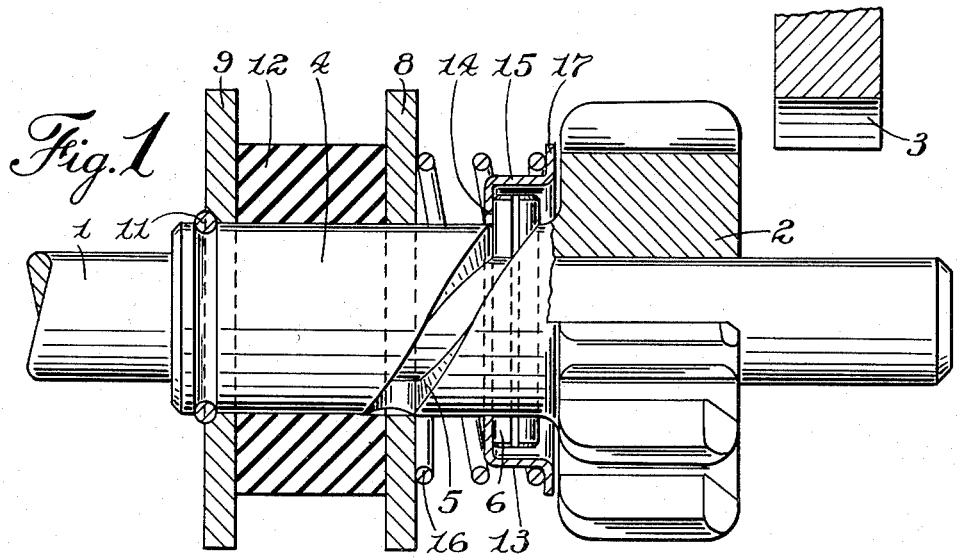
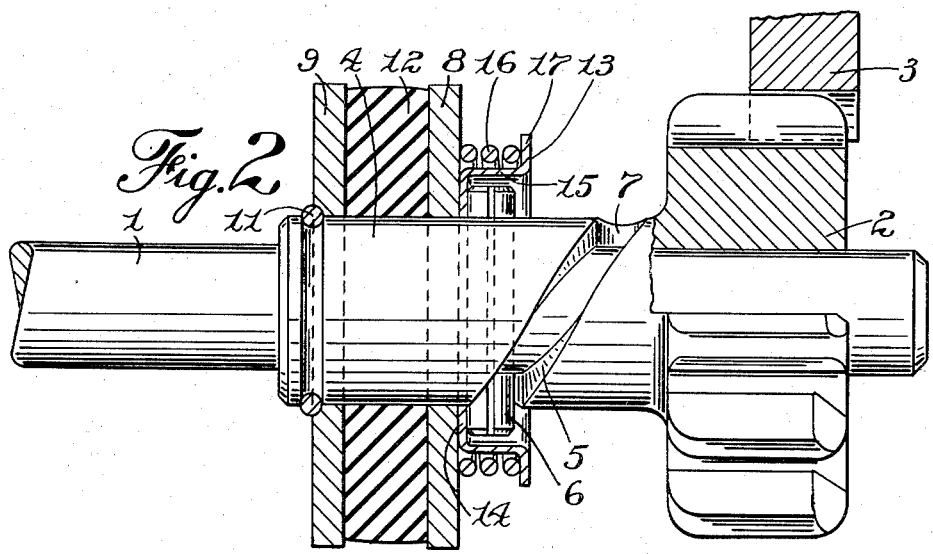
WITNESS:
INVENTOR.
Donald L. Miller
BY
ATTORNEY ated May 17, 1960

2,936,629
ENGINE STARTER DRIVES

Donald L. Miller, Horseheads, N.Y., assignor to Bendix Aviation Corporation, Elmira Heights, N.Y., a corporation of Delaware Application February 14, 1958, Serial No. 715,344

3 Claims. (Cl. 74—9)

The present invention relates to engine starter drives and more particularly to a simple and economical form of drive particularly adapted for small units such as outboard motors for water craft.

It is an object of the present invention to provide a novel starter drive which is efficient and reliable in operation while having few moving parts, and those of simple construction.

Further objects and advantages will be apparent from the following description taken in connection with the accompanying drawing in which:

Fig. 1 is a side elevation partly broken away and in section of a preferred embodiment of the invention showing the parts in normal or idle position;

Fig. 2 is a similar view showing the parts in cranking position.

In Fig. 1 of the drawing there is illustrated a power shaft 1 on which a pinion 2 is slidably journalled for movement into and out of mesh with a gear 3 of the engine to be started. The pinion 2 is provided with an extended sleeve 4 formed thereon or rigidly connected therewith having a spiral slot 5 slidably receiving the radially protruding end of a pin 6 fixedly mounted in the power shaft 1.

The slot 5 terminates at one end with a shoulder 7 against which the pin 6 normally rests, thus defining the idle position of the pinion.

The meshing position of the pinion as illustrated in Fig. 2 is defined by a yielding abutment comprising a thrust ring 8 slidably mounted on the sleeve 4, a second ring 9 fixed on the end of the sleeve 4 by means of a lock ring 11, and an annular block 12 of elastically deformable material interposed between the rings 8 and 9.

A thimble 13 is slidably mounted on the sleeve 4 and bears against the protruding ends of the pin 6. The thimble is dished to provide a radial portion 14 acting as a thrust washer between the pin 6 and the thrust ring 8, a cylindrical portion 15 forming a seat for an anti-drift spring 16, and radial flange 17 forming an abutment for one end of the spring 16. The other end of the spring 16 bears against the thrust ring 8 and thereby yieldably holds the pinion and sleeve assembly in its idle position as shown in Fig. 1. The thimble is arranged to surround the pin 6 and thus prevent its accidental displacement.

In operation, starting with the parts in the positions shown in Fig. 1, rotation of the power shaft 1 causes the pin 6 to traverse the sleeve 4 and pinion 2 to the right, causing the pinion to enter into mesh with the engine gear 3. When this movement of the pinion and sleeve assembly brings the thrust ring 8 into engagement with the thimble 13, the meshing movement of the pinion is yieldingly arrested by the compression of the elastic ring 12, after which the pinion is constrained to rotate with the power shaft.

When the engine starts, the pinion and sleeve assembly is traversed back to idle position where it is maintained thereafter by means of the anti-drift spring 16.

Although but one form of the invention has been shown and described in detail, it will be understood that changes may be made in the design and arrangement of the parts without departing from the spirit of the invention.

I claim:

1. In engine starter gearing, a power shaft, a pin fixedly mounted in the power shaft and projecting radially therefrom, a pinion slidably journalled on the power shaft for movement into and out of mesh with an engine gear, having a sleeve portion formed with a spiral slot slidably engaging said pin and terminating at one end to provide a stop shoulder cooperating with the pin to define the idle position of the pinion, a thrust ring slidably mounted on the pinion sleeve, yielding means connecting said ring for longitudinal movement with said sleeve, said pin being poistioned to arrest the movement of the ring in the meshing direction, and thereby yieldingly arrest the meshing movement of the sleeve and pinion.

2. Starter gearing as set forth in claim 1 including further a thimble slidably mounted on the pinion sleeve in engagement with said pin, and spring means between said thimble and thrust ring urging the pinion and sleeve assembly toward idle position.

3. Starter gearing as set forth in claim 2 in which said thimble is dished to provide a radial portion forming a thrust washer between the pin and the thrust ring, a cylindrical portion surrounding the pin to thereby retain it in the power shaft and forming a support for the spring, and a radial flange forming an abutment for the spring.

References Cited in the file of this patent

UNITED STATES PATENTS

| | | |
|---|---|---|
| 1,876,642 | Doub | Sept. 13, 1932 |
| 1,901,997 | Taylor | Mar. 21, 1933 |
| 1,920,187 | Charter | Aug. 1, 1933 |
| 1,955,110 | Brockway | Aug. 17, 1934 |
| 1,984,297 | Abell | Dec. 11, 1934 |
| 2,604,882 | Schnacke | July 29, 1952 |
| 2,847,985 | Strang | Aug. 19, 1958 |

FOREIGN PATENTS

| | | |
|---|---|---|
| 1,020,457 | France | Nov. 19, 1952 |